United States Patent
Simons et al.

(10) Patent No.: US 6,320,595 B1
(45) Date of Patent: Nov. 20, 2001

(54) GRAPHIC IMAGE GENERATION AND CODING

(75) Inventors: Paul R. Simons, Crawley; Timothy J. Walls, Croydon, both of (GB)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/233,599

(22) Filed: Jan. 19, 1999

(30) Foreign Application Priority Data

Jan. 17, 1998 (GB) .................................................. 9800900

(51) Int. Cl.⁷ .............................. G06T 11/00; G06T 1/00
(52) U.S. Cl. .............................................. 345/619; 345/418
(58) Field of Search ...................................... 345/115, 196, 345/505, 507, 501, 522, 195, 471, 967, 440, 356, 968, 329, 334, 339, 619; 455/566, 550, 575, 90, 95

(56) References Cited

U.S. PATENT DOCUMENTS

| | | | |
|---|---|---|---|
| 5,495,567 | * 2/1996 | Iizawa et al. | 345/356 |
| 5,615,384 | 3/1997 | Allard et al. | 395/800 |
| 5,784,001 | 7/1998 | DeLuca et al. | 331/25 |
| 6,058,397 | * 5/2000 | Barrus et al. | 345/329 X |

FOREIGN PATENT DOCUMENTS

| | | | |
|---|---|---|---|
| 0783154A2 | 7/1997 | (EP) | G06F/12/08 |
| WO9719429 | 5/1997 | (WO) | G08B/5/22 |

* cited by examiner

*Primary Examiner*—Jeffery Brier
*Assistant Examiner*—Chanté Harrison
(74) *Attorney, Agent, or Firm*—Dicran Halajian

(57) ABSTRACT

A method for generating and coding graphic images for transmission to hand-held or mobile devices uses an object-component technique wherein images are composed from a limited set of component types, particularly points and polygons. Images are encoded as a list of objects to be drawn, with each object specified by a command word (FIG. 3) followed by one or more coordinate words (FIG. 4) locating that object in a fixed coordinate image field. The command word indicates the object outline colour (c), the type of object (CC), and whether it is selectable (s) by a user for interactive applications. Parameter bits (p) in the command word indicate point radii or the number of polygon vertices. With a particular type (CC) setting, text strings may be included in the image.

18 Claims, 4 Drawing Sheets

| CC. | Command | Parameter (p) | Data to follow |
|---|---|---|---|
| 00 | Point | Radius of point (0=1 pixel) | 1 Coordinate word, specifying the location of the point to plot. |
| 01 | Text | Reserved (Set to 0) | 1 Coordinate word, followed by a variable number of 7-bit ASCII characters, terminated by a NULL. |
| 10 | Open Polygon | Number of points - 2 | (p+2) Coordinate words specifying each point in the polygon. |
| 11 | Filled Polygon | | |

| Object | Type. |
|---|---|
| 11 | Black unfilled polygon, with 1 edge. |
| 12 | Black unfilled polygon, 4 edges. |
| 13 | Black filled polygon, 7 edges. |
| 14 | White filled polygon, 4 edges. |
| 15 | Black text string. |
| 16 | Black point, radius 1. |
| 17 | Black point, radius 4. |

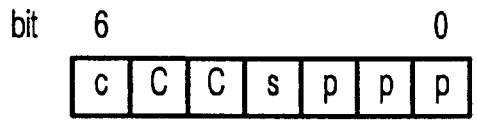
FIG. 3
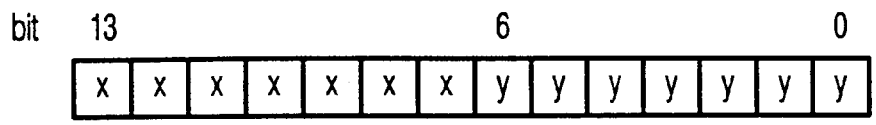
FIG. 4
| CC. | Command | Parameter (p) | Data to follow |
|---|---|---|---|
| 00 | Point | Radius of point (0=1 pixel) | 1 Coordinate word, specifying the location of the point to plot. |
| 01 | Text | Reserved (Set to 0) | 1 Coordinate word, followed by a variable number of 7-bit ASCII characters, terminated by a NULL. |
| 10 | Open Polygon | Number of points - 2 | (p+2) Coordinate words specifying each point in the polygon. |
| 11 | Filled Polygon | | |
FIG. 5

| No. of bits | c | CC. x Value | Parameter y Value | Explanation | Object |
|---|---|---|---|---|---|
| 7 | 1 | 10 | 0 | Open polygon with 2 points | 1. Straight line |
| 14 | | 20 | 70 | First coordinate at (20,70) | |
| 14 | | 30 | 20 | Second coordinate at (30,20) | |
| 7 | 1 | 10 | 3 | Open polygon with 5 points | 2. Black square (not filled) |
| 14 | | 15 | 50 | First coordinate at (15,50) | |
| 14 | | 45 | 50 | Second coordinate at (45,50) | |
| 14 | | 45 | 80 | Third coordinate at (45,80) | |
| 14 | | 15 | 80 | Fourth coordinate at (15,80) | |
| 14 | | 15 | 50 | Fifth coordinate at (15,50) to close square. | |
| 7 | 1 | 11 | 6 | Filled polygon with 8 points | 3. Filled black polygon (arrow shape) |
| 14 | | 64 | 60 | Coordinate | |
| 14 | | 90 | 30 | Coordinate | |
| 14 | | 90 | 40 | Coordinate | |
| 14 | | 117 | 40 | Coordinate | |
| 14 | | 117 | 70 | Coordinate | |
| 14 | | 90 | 70 | Coordinate | |
| 14 | | 90 | 80 | Coordinate | |
| 14 | | 64 | 60 | Coordinate (to close the shape) | |
| 7 | 0 | 11 | 3 | Filled polygon with 5 points | 4. White square (on top of arrow, with the text in it) |
| 14 | | 80 | 50 | Coordinate | |
| 14 | | 110 | 50 | Coordinate | |
| 14 | | 110 | 60 | Coordinate | |
| 14 | | 80 | 60 | Coordinate | |
| 14 | | 80 | 50 | Coordinate (to close square) | |
| 7 | 1 | 01 | 0 | Black text | 5. The "PRESS HERE" text in the arrow. |
| 14 | | 82 | 52 | Location of top-left of first character of text | |
| 70 | | PRESS HERE | | 7-bit ASCII Data | |
| 7 | | <NULL> | | ASCII NULL character to terminate text | |
| 7 | 1 | 00 | 0 | Single-pixel point | 6. Small dot |
| 14 | | 50 | 25 | Coordinate of point | |
| 7 | 1 | 00 | 3 | Point, radius 4 | 7. Big dot |
| 14 | | 66 | 25 | Coordinate of point | |

FIG. 6

GRAPHIC IMAGE GENERATION AND CODING

FIELD OF THE INVENTION

The present invention relates to the formation, manipulation and coding of graphic images and particularly, but not exclusively, to the coding of graphic objects for transmission to, and/or reception from, hand-held or mobile devices of one or more remote users.

BACKGROUND OF THE INVENTION

The majority of the current generation of hand-held mobile devices are driven by text-based user interfaces. Through these interfaces, the user is enabled to browse the handsets range of functionality and select and perform the required tasks. Such mobile devices can also exchange information using protocols such as the Short Message Service (SMS) part of the Global System for Mobile communications (GSM) digital standard. These text based displays have a limited capability and lack the flexibility of display and appeal of graphical information. Increasingly there is a desire to incorporate graphical information to improve both the user interface and the exchange of information.

An example of a mobile messaging system seeking to improve the ready understandability of messages through the use of displayed graphic icons to represent or support a message is described in International patent application WO97/19429 (Motorola/Deluca et al). In the mobile telephone receiver described, a graphics database holds image data for a number of predetermined images, each identified by a respective (and standardised) code. On receipt of a paging message from another user, the handset processor scans the message firstly to identify whether it contains the code or codes for one or two of the images stored in the graphics database and, on finding these, it generates these images on a display screen of the handset. Secondly, it scans the message for any character string data which, if found, will be converted to a text message and displayed on screen below the image or images.

Whilst this arrangement can add to the appeal and understandability of the paging message, its flexibility is limited by the need for the image data to be pre-loaded to the handset although various techniques are described for updating the handset's graphic database, from manual data entry through to over-the-air downloading of graphics data files, the problem remains that the identity of each of this finite set of images must be standardised—at the very least between pairs of users who intend to utilise the service.

SUMMARY OF THE INVENTION

It is, therefore, an object of the present invention to provide an extremely compact generation and coding technique for images to be displayed on the screens of hand-held or mobile apparatus, which data may be sent as the whole or part of a message.

It is a further object to provide a communications apparatus configured to receive, decode and display such coded images.

In accordance with a first aspect of the present invention there is provided a method for generating and coding for transmission a graphic image, comprising the steps of: composing the image from a plurality of component objects from a predetermined set of object types, the composition including scaling and locating of each object within a fixed coordinate set image field; generating an ordered rendering list identifying the order in which the component objects are to be rendered on regeneration of the image; sequentially coding each object of the list as a first data word identifying the object type and one or more further words specifying coordinates for said object. By specifying the image in the form of an overlaid arrangement of objects (which may include points, polygons and text strings) the sender has great flexibility in the form of image that may be sent. Also, by the restriction to a finite set of object types, the amount of data required to transmit the image is kept very low.

In order to permit a certain amount of interactivity, receivers of the images may be enabled to select one or more of the objects making up the image, to which end the first data word may include an indicator as to whether that object is selectable from among those of the complete image by a receiver of the image. The first data word may also include an indicator as to whether the respective object is to be reproduced as outline or to be filled in: where the object is a polygon, following the first data word, the following further words may suitably specify in sequence coordinates within the image field of each vertex of said polygon, such that irregular and relatively complex polygonal shapes may be specified.

The fixed coordinate set image field (suitably 128 pixels square) enables all object coordinates to be specified relative to one another without requiring knowledge of the size or resolution of the target device display screen.

Also in accordance with the present invention there is provided a portable communications apparatus configured to receive and decode graphics images generated and coded in accordance with the method outlined above, the apparatus comprising: a display device coupled with a display driver circuit arranged to format images for display; a receiver coupled with said display driver and being configured to receive the coded image data and pass it to the display driver; and first storage means coupled with said display driver and containing said object identifier codes, said display driver being configured to reconstruct the image from the object data and output the same to the display.

Where the display differs in height and/or width compared to the image field, the apparatus may further comprise multiplication means coupled with the display driver and arranged to scale the image object coordinates to the size of the display.

Suitably, the apparatus may further comprise input means by operation of which a user may select one or more of those displayed objects identified in the code stream by its first data word as selectable, which input-means is suitably coupled with message formatting and transmission means configured to generate a signal identifying the selected object and transmit the same to the image originating source. These input means may comprise a touch screen overlaying the display or, where the apparatus further comprises a plurality of user operable controls (for example numerical keys of a portable telephone) the input means may be provided as selectable secondary functions of these user operable controls.

Thus the method provides a means for describing graphical images for display in terms of objects, in a format optimised for low bit-rate mobile data communications. The method allows objects to be displayed in a device independent manner on low to medium resolution graphical displays such as those of mobile telephones or PDA's. Additionally, in some embodiments, the scheme enables users to select objects using a variety of methods, for example touch screens or via a cursor selection. Information regarding which object is selected may be communicated back to the originator thereby enabling use in, for example, navigation and interactive displays.

BRIEF DESCRIPTION OF THE DRAWINGS

Preferred embodiments of the present invention will now be described by way of example only and with reference to the accompanying drawings in which:

FIG. 3 represents the bit-structure of a command word identifying an object;

FIG. 4 represents the bit-structure of an object coordinate specification;

FIG. 5 is a table of object type-bit values from the command word of FIG. 3 and their respective meanings;

FIG. 6 is a table detailing the sequential coding of each of the objects in the image of FIG. 1.

DETAILED DESCRIPTION OF THE INVENTION

In order to permit the direct transmission of graphic images to hand-held or mobile devices, a component object specification is used which describes an image by the objects comprising it (lines, polygons, points/circles etc.). The applicants have recognised that describing an image this way is a valuable technique for such devices due to the favourable trade-off between the generally small overall size of the encoded image, and the consequently reduced level of processing required in the display device. The principal advantage of sending images in component object form is the size of the encoded image. For simple line drawings, the low-redundancy nature of the encoding can result in considerable savings over a bitmap-based encoding. A useful additional feature is that the image can be easily scaled to an arbitrary size at the point of display, allowing the image sent to be displayed consistently regardless of the display device.

Because the image is based on objects with a clear relationship between the encoded object and the visual object (e.g. one object may be the outline of a house), it is possible to attach additional information to objects—for example, whether or not the object can be "selected" by the user, say, by pointing at it with a cursor or via a touch-screen—in a logical manner. With regard to the processing required to display the image, since the data is sent as series of vectors, algorithms for drawing lines and filling areas of the display must be implemented in the display device. However, as will be understood, such algorithms are well-known and can be efficiently implemented.

Figures 1, 2:
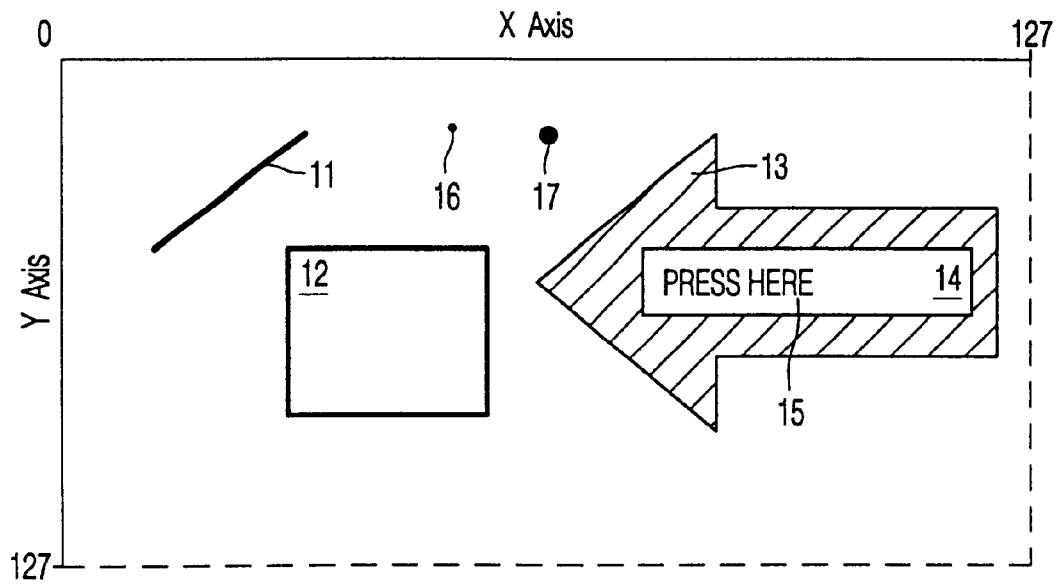
FIG. 1 is an example component object image formed from seven objects.
FIG. 2 is a table of the respective properties of each of the objects in the image of FIG. 1.

Component object images as used in the following examples are comprised of three main drawing objects: points, text, and polygons; a polygon may have between one and nine edges and, assuming a monochrome or two-colour display, may be filled or unfilled. Each object can be drawn in either "black" (with pixels set) or white (pixels are cleared). FIG. 1 shows an example component object image 10 constructed from a total of seven objects 11–17. Note that it is possible to overlay objects on top of each other; objects are drawn in the order in which they are specified in the encoded data stream (as will be described below) and the encoded data therefore represents an ordered list of display objects. This implicit information (i.e. the number of the object in the list) does not need to be communicated explicitly but may be used to return information to the originator of the image (for example the number of an object which the user has selected).

As an example, the properties of each object in the example image of FIG. 1 are as shown in the table of FIG. 2. Because object 14 (a white filled polygon) was drawn after object 13 (black filled polygon) it appears on top of the arrow-shaped polygon 13. Likewise the text string (object 15) appears on top of the white filled polygon 14.

All vertices in component object images are specified in a fixed coordinate image field using the XY coordinate system shown in FIG. 1, with the origin in the top left hand corner and a range 0–127 for each axis. Although the image field is "square" (the ranges for the X and Y axes are the same), the display device is unlikely to be. The image will be scaled in the terminal to fit the display.

Although the exact display resolution of the display is not necessarily known when an image is being drawn, it is suggested that images are designed to be drawn with an aspect ratio consistent with the display device, where known: the aspect ratio is the ratio of width to height such that a display 160 pixels wide and 64 pixels high would have an aspect ratio of 2.5 and the source images should be scaled accordingly. Alternatively, the operator could specify in a header to the message containing a component object image the intended display resolution and arrange for the terminal to scale the data accordingly.

The encoding of component object data is intended to be particularly compact: every object to be drawn is sent a command word followed by a variable length of data. The data may be characters (7-bit ASCII) or coordinates (14-bits). It is assumed in this example that the receiver/decoder knows in advance the length of the component object data, and therefore there is no explicit termination; a number of mechanisms may be used to communicate this to the display terminal as will be well understood—for example it may form part of the SMS packet header, if a GSM mobile telephone was the receiving device.

The commands are formatted as 7-bit words of data. The overall bit format is as shown in FIG. 3, with all data being encoded in the order of most-significant to least significant bit. The first bit, c, is the colour bit and indicates whether the object perimeter line is to be drawn in the background colour ("white"; c=0) or the foreground colour ("black"; c=1). The next two bits, CC, indicate the type of object (point, text, filled or unfilled polygon), following which is one bit, s, indicating whether or not object may be selected at the device of a receiving user (0=no; 1=yes), then three bits, ppp, to specify a parameter value of 0–7. The meaning of the three parameter bits, ppp, depends on the object type CC selected (described below).

Commands may be followed by coordinates in terms of the image field and formatted as shown in FIG. 4, with the first seven bits giving a value 0–127 for the X coordinate, and the other seven bits giving a value 0–127 for the Y coordinate.

Every command word effectively creates a new display object. In addition to the information required to actually render the object, described below, each object has a "selectable" attribute, indicating to the display terminal by the setting of the s bit in the command word whether or not an object may be selected by the user. For example, an image representing the United States political map may make each state boundary (coded as a polygon object) a selectable object; this would allow a user to graphically select a state by some means in order to, say, request further (location specific) information.

A number of methods by which the user may select objects will be apparent to the reader and will depend upon the capabilities of the display terminal. Note, however, that by attaching the notion of selectability to the object rather than to a physical area of the display, it is possible with devices with no actual pointing device to still select objects—for example, a mobile telephone may use the up/down keys to cycle a cursor through each of the selected objects, or cause each selectable object in turn to blink on and off (by periodically toggling the value of the colour bit c), prior to pressing another key to indicate selection.

The two C bits of the command word indicate the type of object to be drawn. This also determines the meaning of the parameter bits ppp of the command word. The table of FIG. 5 shows the possible settings and their meanings. Note that a point command (CC=00) specifies a filled circle having a radius of from 1 to 8 pixels (ppp=000 to ppp=111) centred on the point identified by the single following coordinate word. Also, the single coordinate word following the three parameter bits of a text command (CC=01) specifies the location of the top left part of the first character of the text (assuming a fixed text size in the display device). With regard to the coordinate words following a polygon command (CC=10 or 11), if the last point of a filled polygon does not match the first point, the polygon is implicitly closed by a straight line from the last point to the first. With regard to a polygon command, it will be noted that the parameter bits ppp represent the number of vertices minus two: this recognises that the simplest polygon that may validly be specified has two vertices (i.e. it is a line, as object 11 in FIG. 1) which enables the range to be shifted and thereby handle the specification of polygons of up to nine vertices.

By way of a detailed example, the table of FIG. 6 shows the component object encoding of the example image shown in FIG. 1; from this it can be seen that the entire image can be expressed in 448 bits, or 56 bytes, of data.

Figure 7:
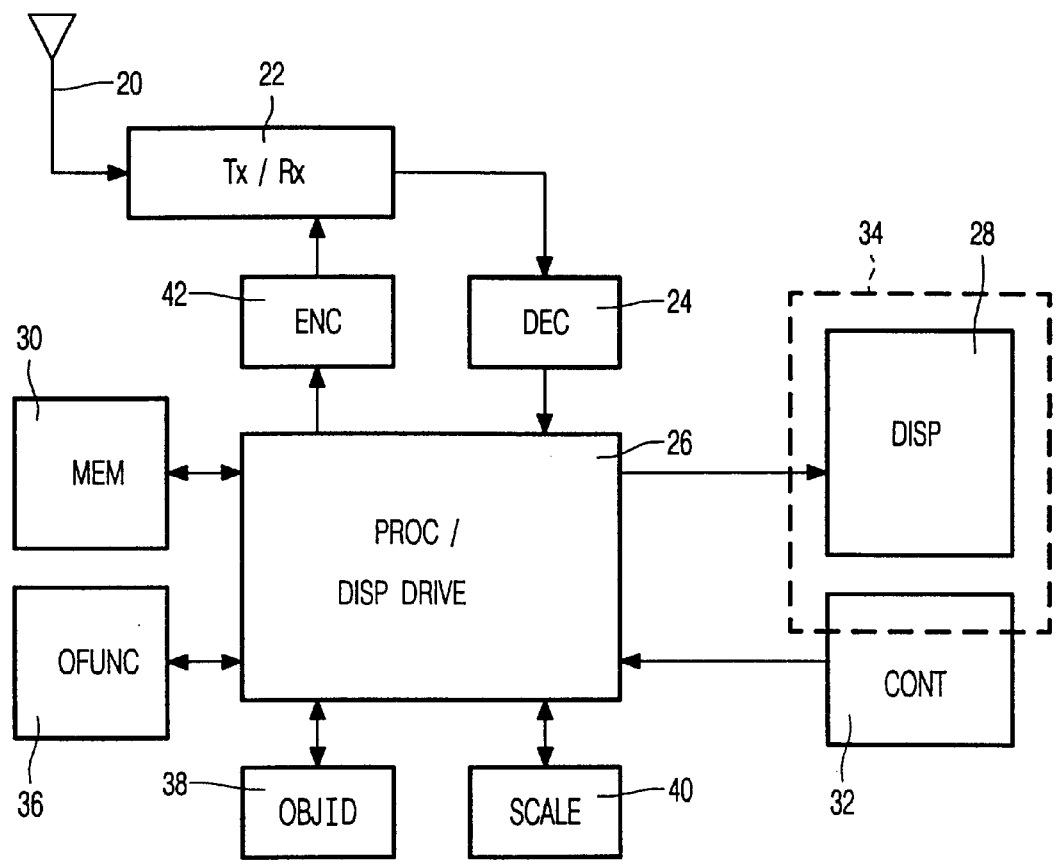
FIG. 7 is a block schematic diagram of a receiver apparatus suitable to embody the present invention.

A block schematic diagram of a mobile/hand-held receiver configured to receive and handle the component object encoded messages is shown in FIG. 7. The functioning of many of the component parts will be well understood by the skilled reader and, other than in terms of their bearing on the operation of the present invention, they will not be described in detail.

From an aerial 20 or other signal input, the received signal is passed via transceiver 22 and decoder 24 stages to a central processing unit 26, which unit also (in this embodiment) handles the function of display driver formatting graphical and text data into display commands for output to display screen 28. An apparatus memory 30 is coupled with the processor and holds basic operating data and programs for the device. User input to the processor 26 is via controls 32: these may be in the form of a simple keypad and/or they may be combined with the display 28 through a touch-screen arrangement, as indicated by dashed line 34. Other conventional functions of the device (for example audio handling) are illustrated generally at 36.

Coupled with the processor 26 is a further store 38 containing the command word codes (see FIGS. 3 and 5) to enable the processor/display driver 26 to interpret received command words and recreate the encoded image: this memory may also hold the table of ASCII codes for text strings. Also coupled with the processor 26 is a scaling stage 40 which may comprise a simple hardware arrangement of multipliers to convert the image field coordinates in the received data stream to fit the available area and aspect ratio of the display device 28. Finally, output signals from the processor 26 such as speech messages, indications of object selections, or new graphic images generated on the device (by user operation of the controls 32) are sent via encoder 42 to the transceiver 22 for sending.

As will be recognised, many variations are possible on the arrangement of FIG. 7. For example, the command word code store 38 may be incorporated with the general device memory 30. Also, the decoder 24/encoder 42 and/or scaling circuit 40 functions may be embodied completely in software and carried out in processor 26. Alternatively or additionally, the display driver functions of the processor may be handled by a separate unit, optionally with a display memory from which display data would be read out.

Touch-screens 34 are highly suited to graphical displays. They provide not only a method for object selection but also for object creation. Such an input mechanism coupled with the encoding mechanism would allow graphical information to be packed into a message that could be sent and decoded at the receiver to enable graphics to be exchanged between mobile devices.

A wide variety of application areas are possible including: user configurable user interfaces, message construction using server clip-art, car map navigation, traffic information, a whole host of interactive games including chess and draughts etc. A touch-screen user interface using the encoding techniques described allows the pen to draw while the device phone encodes the drawing. Using this input mechanism, messages may be personalised by allowing drawing and handwritten text to be incorporated in messages exchanged between mobile appliances. The ability to individually select objects enables complex hotspots to be defined and overlaid at the same time as the shapes themselves.

From the foregoing, it will be seen that we have provided a mechanism whereby objects may be coded in a format optimised for low bit-rate mobile data communications. The coding scheme allows objects to be mapped to relative screen coordinates enabling the images to be rendered in a device-independent manner. Additionally, since the objects are given a separate identity in the coding scheme, they may also be separately highlighted and selected on the screen. Information regarding which object is selected may be communicated back to the originator enabling navigation and interactive displays.

From reading the present disclosure, other modifications will be apparent to persons skilled in the art. Such modifications may involve other features which are already known in the design, manufacture and use of interactive image coding equipment and component parts thereof and which may be used instead of or in addition to features already described herein. Although claims have been formulated in this application to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

What is claimed is:

1. A method for generating and coding for transmission a graphic image, comprising the steps of:
   composing the image from a plurality of component objects from a predetermined set of object types, the composition including scaling and locating of each object within a fixed coordinate set image field;
   generating an ordered rendering list identifying the order in which the component objects are to be rendered on regeneration of the image; and
   sequentially coding each object of the list as a first data word identifying the object type and one or more further words specifying coordinates for said object, said first data word further including parameters, said parameters being a number of vertices minus two when said object type is a polygon.

2. A method as claimed in claim 1, wherein said first data word includes an indicator as to whether that object is selectable from among those of the complete image by a receiver of said image.

3. A method as claimed in claim 1, where the object is a polygon and, following the first data word, said further words specify in sequence coordinates within image field of each vertex of said polygon.

4. A method as claimed in claim 1, where the fixed coordinate set image field is 128 pixels square.

5. A portable communication apparatus configured to receive and decode graphics images generated and coded in accordance with a method comprising the steps of:
   composing the image from a plurality of component objects from a predetermined set of object types, the composition including scaling and locating of each object within a fixed coordinate set image field;
   generating an ordered rendering list identifying the order in which the component objects are to be rendered on regeneration of the image; and
   sequentially coding each object of the list as a first data word identifying the object type and one or more further words specifying coordinates for said object, said first data word further including parameters, said parameters being a number of vertices minus two when said object type is a polygon;
   the portable communication apparatus comprising:
      a display device coupled with a display driver circuit arranged to format images for display;
      a receiver coupled with said display driver and being configured to receive coded image data and pass the coded image data to the display driver;
      first storage means coupled with said display driver and containing object identifier codes, said display driver being configured to reconstruct the image from the object identifier codes and output the image to the display.

6. Apparatus as claimed in claim 5, further comprising multiplication means coupled with said display driver and arranged to scale the image object coordinates to the size of the display.

7. Apparatus as claimed in claim 5, wherein said input means comprises a touch screen overlaying said display.

8. Apparatus as claimed in claim 5, further comprising a plurality of user operable controls wherein said input means are provided as selectable secondary functions of said user operable controls.

9. A device for generating and coding to transmit an image, comprising:
   means for composing the image from a plurality of component objects from a predetermined set of object types, including scaling and locating of each object within a fixed coordinate set image field;
   means for generating an ordered rendering list identifying order in which the component objects are to be rendered on regeneration of the image; and
   means for sequentially coding each object of the list as a first data word identifying the object type and one or more further words specifying coordinates for said object, wherein said first data word includes parameters, said parameters being a number of vertices minus two when said object type is a polygon.

10. The device of claim 9, wherein said first data word includes an indicator as to whether said object is selectable from among said objects of the image by a receiver of said image.

11. The device of claim 9, wherein said object is a polygon and, following the first data word, said further words specify in sequence coordinates within image field of each vertex of said polygon.

12. The device of claim 9, wherein said fixed coordinate set image field is 128 pixels square.

13. A method as claimed in claim 1, wherein said first data word includes an indicator as to whether that object is to be reproduced as outline or to be filled in.

14. A portable communication apparatus as claimed in claim 5, further comprising input means by operation of which a user may select one or more of those displayed objects identified in the code stream by its first data word as selectable, the apparatus including message formatting and transmission means configured to generate a signal identifying the selected object and transmit the same to the image originating source.

15. The method of claim 1, wherein said coordinates are relative to other coordinates of other objects.

16. The portable communication apparatus of claim 5, wherein said coordinates are relative to other coordinates of other objects.

17. The device of claim 9, wherein said coordinates are relative to other coordinates of other objects.

18. The device of claim 9, wherein said first data word further includes an indicator as to whether said object is to be reproduced as outline or to be filled in.

* * * * *